(12) United States Patent
Paproski

(10) Patent No.: US 6,932,412 B1
(45) Date of Patent: Aug. 23, 2005

(54) TRAILER COVER

(76) Inventor: Vern Paproski, 223-44th Street E., Saskatoon, Saskatchewan (CA) S7K 8E4

( * ) Notice: Subject to any disclaimer, the term of this patent is extended or adjusted under 35 U.S.C. 154(b) by 39 days.

(21) Appl. No.: 10/771,384

(22) Filed: Feb. 5, 2004

(51) Int. Cl.[7] .................................................. B60P 7/02
(52) U.S. Cl. ......................... 296/100.06; 296/100.01; 296/100.02; 296/100.07; 296/100.08; D12/101
(58) Field of Search ................ 296/100.01, 100.02, 296/100.06, 100.07, 100.08, 159, 181.3, 296/182.3, 186.1, 186.4; 150/165, 166; D12/101

(56) References Cited

U.S. PATENT DOCUMENTS

| | | | | |
|---|---|---|---|---|
| 3,721,467 A | * | 3/1973 | Kerr ....................... | 296/100.02 |
| 4,943,108 A | * | 7/1990 | Turnbull ................ | 296/100.07 |
| 5,636,893 A | * | 6/1997 | Wheatley et al. ....... | 296/100.07 |
| 5,641,192 A | * | 6/1997 | Smith et al. ........... | 296/100.06 |
| 5,681,074 A | | 10/1997 | Christensen | |
| D406,800 S | | 3/1999 | Nece | |
| 5,988,195 A | * | 11/1999 | Kaestner et al. ....... | 296/100.01 |
| 6,199,909 B1 | * | 3/2001 | Kass et al. ............. | 296/100.08 |
| 6,213,539 B1 | * | 4/2001 | Williams et al. ....... | 296/100.06 |
| 6,488,329 B1 | | 12/2002 | Smith | |

OTHER PUBLICATIONS

Let's Go Aero (1) card.
Becker Built Trailers (1 page) brochure.
The Ramp Master (1 page) flyer.
Fast Enterprises Inc. (1 page) brochure.
Easy Hauler (1 page) brochure.
Atlantic Coast Trailer Sales (1 page) flyer.
Scott Mfg. Limited(1 page) catalogue page.
Supertrax (4 pages)—internet site download.
Triton Aluminum Trailers (1 page) brochure.
Floe International Inc. (14 pages) brochure.
Polaris (16 page) brochure.
Floe International Inc. (11 page) brochure.

* cited by examiner

*Primary Examiner*—Lori L. Coletta
(74) *Attorney, Agent, or Firm*—Ryan W. Dupuis; Adrian D. Battison; Michael R. Williams

(57) ABSTRACT

A cover for a flatbed trailer comprises two symmetrical halves of an outer shell forming the cover which are secured to respective longitudinal sides of the deck of the trailer for pivoting into an open position in a sideways lateral direction. The front and rear ends of the deck of the trailer are thus unobstructed for loading with ramps as desired.

19 Claims, 3 Drawing Sheets

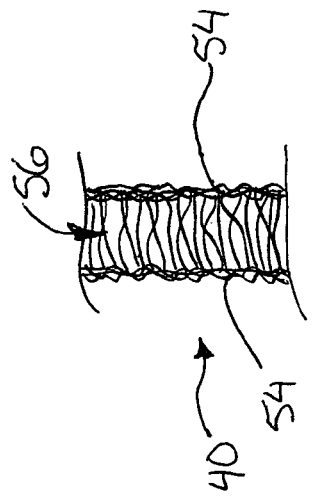
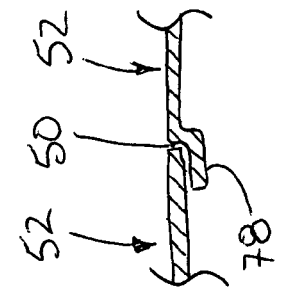
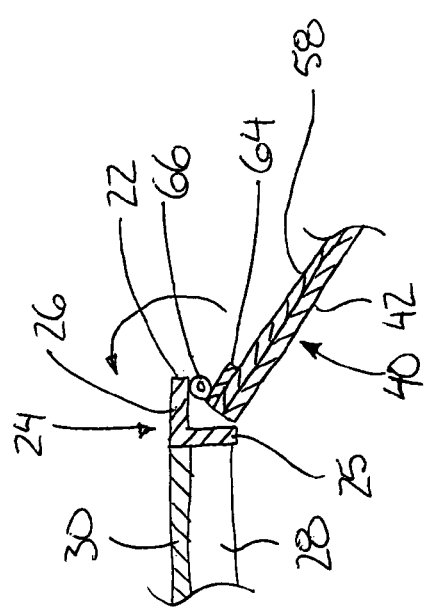
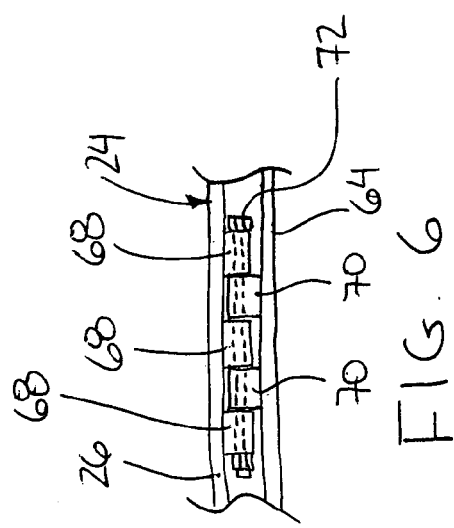

TRAILER COVER

FIELD OF THE INVENTION

The present invention relates to a cover for a flatbed trailer having a deck, and more particularly relates to a cover which can be pivotally supported in relation to the deck.

BACKGROUND

The use of flatbed trailers are well known for carrying various cargo behind a wheeled vehicle. A common variety of flatbed trailer includes ramp attachments at front and rear ends of the trailer for loading recreational vehicles thereon, including snowmobiles, personal all terrain vehicles and motorcycles. Often it is desirable to protect the equipment carried on the flatbed from the elements with a suitable cover.

U.S. Pat. No. 5,681,074 to Christensen and U.S. Pat. No. 6,488,329 to Smith disclose examples of flatbed trailers in which a cover is provided in the form of a domed shell which is pivoted on the flatbed deck at respective front or rear ends of the deck between respective open and closed positions. Covers for flatbed trailers are typically of this design, in which the cover is pivoted in the direction of travel of the vehicle either forwardly or rearwardly. Due to loading typically being in the same direction as the direction of travel, the cover limits the overhead clearance in the direction of loading. For example, a person sitting on a snowmobile typically has to duck as the vehicle is driven onto the flatbed deck of the trailer. When sitting on a personal all terrain vehicle, the operator would have to lay down on the seat to avoid collision with the prior art overhead covers, whereas a motorcycle operator typically cannot even sit on the vehicle due to the higher ride height and less stable configuration of the vehicle. Furthermore such one piece covers are typically heavy and awkward for a single operator to handle and thus two persons are usually required for loading unless a linkage is provided for assistance in lifting the cover. The linkages which assist in lifting such covers however provide further limitations to the amount of overhead clearance as the degree to which the cover can be lifted is further limited by the linkage. These prior one piece designs for covers are also readily susceptible to catching gusts of winds which may tear the cover from the flatbed causing considerable damage and possible harm to surrounding persons.

A further design of a cover for a flatbed trailer is illustrated in U.S. Design Patent 406,800 to Nece in which a frame is provided with an overhead beam spanning laterally across the trailer spaced above the deck. A front and rear cover are pivotally coupled to opposing front and rear sides of the overhead beam for pivotal movement in respective forward and rearward directions as the covers are opened. The overhead beam and forward and rearward pivotal movement of the overhead covers again provides limitations to overhead clearance when loading or unloading recreational vehicles and the like.

SUMMARY

According to one aspect of the present invention there is provided a cover for a flatbed trailer supported for rolling movement in a forward direction and having a deck with longitudinal sides extending between front and rear ends of the deck, the cover comprising:

an outer shell including a top, two side walls, a front wall and a rear wall, the outer shell being longitudinally divided into two sections, each section including one side wall and a portion of each of the top, the front wall and the rear wall; and hinges for coupling the side walls to respective longitudinal sides of the deck whereby each section is pivotal transversely to the forward direction in relation to the respective longitudinal sides.

By providing a cover which is longitudinally divided and which includes hinges for coupling to the longitudinal sides of the deck of the trailer, the sections of the cover can be pivoted in a sideways direction laterally outward transverse to the forward direction and loading direction of the trailer. The hitch at the forward end and the ramps at both the front and the rear ends of the trailer provide no interference to pivoting movement of the sections of the cover and accordingly the cover sections may be fully opened and folded to the ground. Hinges along the longitudinal sides of the deck ensure that the deck surface is uninterrupted with full clearance at front and rear ends for access to ramps typically provided on flatbed trailers. The two separate sections can be individually easily handled by a single operator by opening the sections one at a time. Once opened there are no limitations to the overhead clearance of persons riding a recreational vehicle onto the flatbed trailer for example. The overhead clearance is only limited by the amount of cargo that can be stored on the deck before the cover is closed. During loading however there is no overhead interference as in the prior art covers for flatbed trailers.

The two sections of the outer shell preferably overlap one another at a seam extending longitudinally in which one of the sections includes a gutter along a free edge thereof adjacent the seam and the other section includes a depending flange along a free edge thereof received within the gutter.

Each section may include a rigid lining along an inner surface of the side wall for strength. A handle in this instance, may be provided on an outer side of the side wall to be secured to the rigid lining.

Each section may also include a rigid beam along a bottom edge of the section for added strength.

The two sections forming the outer shell are preferably symmetrical about a vertical plane lying through a longitudinal seam between the two sections.

The front wall may be sloped upwardly and rearwardly towards the top while the rear wall may be sloped upwardly and forwardly to the top for improved aerodynamics.

The outer shell may be formed of layers of fibreglass material with a core spanning therebetween. A rigid lining is preferably located on at least one wall of the fibreglass material.

Alternatively, each section may be integrally moulded of plastic material.

When in combination with a flatbed trailer having a deck surface and a ramp selectively coupled to front and rear ends of the deck surface, the outer shell preferably overlaps a peripheral edge of the deck. When the deck includes lateral flanges projecting outwardly from respective longitudinal sides of the deck, the hinges are preferably coupled to an underside of the lateral flange.

The hinges may include a first portion secured to the longitudinal sides of the deck and a second portion secured to the side walls of the outer shell with the first and second portions preferably being selectively separable from one another.

The side walls, the front wall and the rear wall of the shell are all preferably aligned with respective edges of the deck in the closed position of the outer shell.

The upper surface of the deck preferably remains uninterrupted by the hinges in both open and closed positions of the cover. Mounting of the hinges to an underside of the longitudinal sides of the deck ensures that the deck remains flat and free of interruptions from hardware once the covers are removed at the removable bolts of the hinges.

BRIEF DESCRIPTION OF THE DRAWINGS

In the accompanying drawings, which illustrate an exemplary embodiment of the present invention:

FIG. 5 is an enlarged sectional view of one of the hinges with the cover pivoted into an open position.

FIG. 6 is a plan view of one of the hinges.

FIG. 7 is an enlarged sectional view of a portion of the outer shell of the cover.

FIG. 8 is a sectional view along the line 8—8 of FIG. 4.

DETAILED DESCRIPTION

Figure 1:
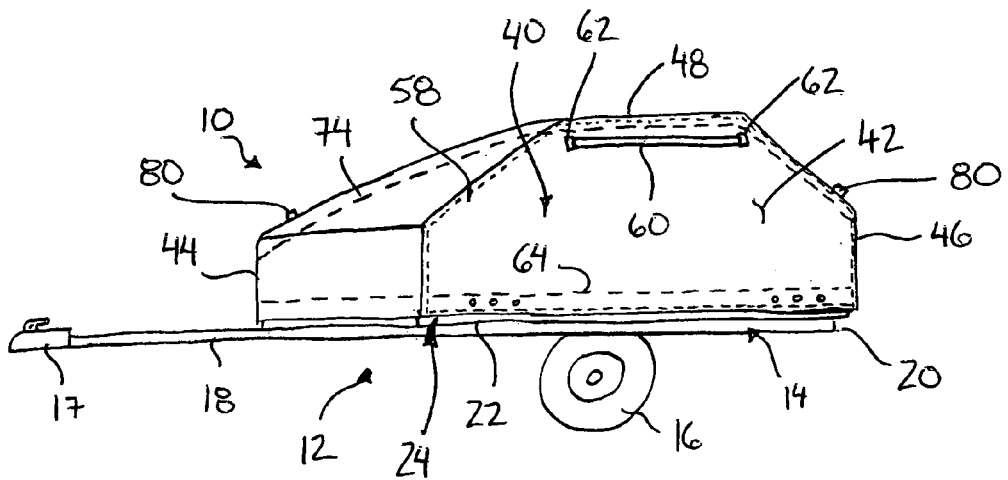
FIG. 1 is a side elevational view of a cover supported on a flatbed trailer.

Referring to the accompanying figures, there is illustrated a cover generally indicated by reference numeral 10. The cover is particularly suited for use on a flatbed trailer 12.

The trailer 12 is conventional type trailer including a frame 14 supported on wheels 16 for rolling movement in a forward direction of travel of a towing vehicle. The trailer includes a hitch 17 at a front end 18 and a deck 19 which spans from the hitch to a rear end 20 of the trailer. The front end of the deck 19 is V-shaped tapering forwardly to an apex at the tongue of the hitch 17. The rear end 20 of the deck is square with respect at longitudinal sides 22 of the trailer.

The frame includes a pair of side rails 24 which define the longitudinal sides 22 of the trailer which are parallel and spaced apart. Each side rail 24 comprises an angle including a vertical flange 25 and a horizontal flange 26 which projects laterally outwardly from the vertical flange to a free end and an outer side of the trailer. Cross supports 28 span between the opposing rails recessed in relation to a top surface of the rails such that plywood decking material 30 can be supported on the cross supports 28 to span the rails 24 flush with the top side thereof. Ramps 32 are provided for connection at the front and rear ends of the trailer to assist in loading the deck. When not in use, the ramps 32 are stored slidably below the deck of the trailer from the rear end. Longitudinal supports 34 of the frame support the cross supports 28 thereon on wheel assemblies of the wheels 16.

The cover 10 includes an outer shell 40 which is generally domed in shape for spanning overtop of the deck. The shell includes opposed side walls 42 which are parallel and spaced apart, having a length which corresponds to the length of the respective longitudinal sides 22 of the deck which the side walls 42 span. A front wall 44 of the cover is generally V-shaped having a profile with an apex which matches the front end of the trailer. Similarly the rear wall 46 is flat and vertical, corresponding to the rear end of the deck which is square with the sides of the trailer.

Each of the front and rear walls includes a vertical portion at a bottom end of the outer shell directly adjacent the cover, and a sloped portion which tapers upwardly and inwardly from the vertical portion towards a flat top 48 of the outer shell. The front wall tapers upwardly and rearwardly while the rear wall tapers upwardly and forwardly. The flat top spans the side walls 42, the front wall 44 and the rear wall 46 spaced above the bottom end of the outer shell which is open to the deck to form an enclosure with the deck when supported thereon. The walls of the shell have suitable shape and dimension to correspond to the shape of the deck of the trailer while being just slightly larger in dimension so that the walls of the outer shell overlap over the edges about a periphery of the deck on all sides thereof.

The outer shell 40 is divided at a central longitudinally extending seam 50 which extends from an apex at the front wall 44 across the top 48 to the rear wall 46 centrally between the opposed side walls 42. The outer shell 40 is thus divided into to substantially equal sections 52 which are symmetrical about a vertical plane lying through the longitudinal seam between the two sections. Each section includes one entire side wall 42 and an equal portion of each of the top 48, the front wall 44 and the rear wall 46.

The outer shell 40 is formed of fibreglass comprising two layers of fibres 54 joined by a fibrous core 56 spanning between the layers of fibres 54 as illustrated in FIG. 7. A resin coats the fibres to form a stiff panel structure. The side wall 42 within each section of the outer shell 40 includes a rigid lining 58 comprising a sheet of plywood or other suitable material which spans an inner side of the flat portion of the vertical side walls 42. The panel may be imbedded into the fibreglass fibres and bonded to the fibreglass by the resin.

A handle 60 is provided on each side wall 42 in the form of a horizontal bar bolted to the side wall 42 by bolt flanges 62 at the ends of the bar. The handle 60 is secured adjacent the top of the side walls 42 with suitable fasteners which penetrate through to the rigid panel lining 58 for added strength.

For added rigidity, a base member 64 is provided along the bottom edge of each section 52 of the outer shell. The base member 64 comprises a flat bar of rigid metal approximately two inches in height which extends along an inner surface of the lining 58 of each side wall 42. The base member 64 continues along the front and rear walls such that the base member of each section of the outer shell is formed of a one piece construction including a side portion and respective front and rear portions to maintain a generally U-shaped structure along the base of each outer shell section 52 following the peripheral profile of the deck.

Figure 4:
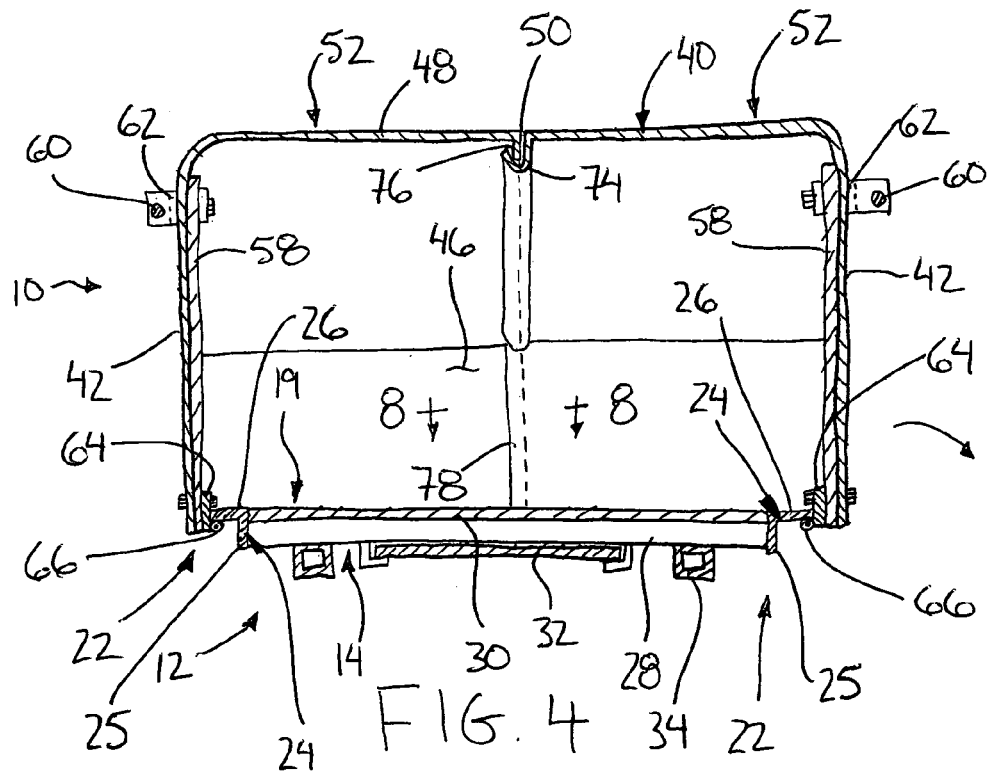
FIG. 4 is a sectional view along the line, 4—4 of FIG. 2.

The sections 52 of the outer shell are pivotally secured to respective longitudinal sides of the deck by respective hinges 66 at spaced positions along each longitudinal side of the deck. Each hinge includes a first set 68 of cooperating apertures secured below the horizontal flange of the side rails 24 of the deck and a second set 70 of cooperating apertures at corresponding positions along the flat bar forming the base member 64. The second set 70 of cooperating apertures are positioned on the inner surface of the base member such that the base member overlaps the horizontal flange 26 to depend downwardly from the free end thereof in the closed position as illustrated in FIG. 4.

A removable bolt 72 is received through the aligned cooperating apertures of the first and second sets to complete the assembled hinges 66 in operation. To remove the cover from the trailer, the bolts 72 are removed whereby the outer shell 40 along with the second set 70 of cooperating apertures are freely removed from the deck and only the first set of cooperating apertures remains secured to the underside of the side rails 24 of the frame. Minimal modification of the deck is thus required for installation of the cover thereon and the deck remains flat and uninterrupted by remaining hardware. The cover is removed along with the first set 68 of apertures, leaving only the second set 70 of apertures, below the surface of the deck remaining.

The sections 52 of the outer shell 40 mate with one another at the seam 50 by providing a gutter 74 along a free edge of a first one of the sections 52 and a depending flange 76 along a free edge of the other section 52. The gutter 74 comprises a U-shaped channel formed integrally with the top end walls of the respective section of the outer shell along one edge thereof with the channel being oriented to face upwardly along the open side thereof. Accordingly the depending flange 76 is suitably sized to extend downwardly into the open top side of the U-shaped channel forming the gutter 74 when the outer shell is in the closed position. The gutter 74 and flange 76 are located along the edges of the seam 50 at the top 48, and at the non vertical or sloped portions of the front wall 44 and the rear wall 46.

At the vertical portions of the front and rear wall, a suitable flange 78 is provided on one of the sections for overlapping at an interior surface the opposing section.

Latches 80 are provided at the outer surface of the sections to extend across the seam 50 adjacent the front and rear walls of the outer shell.

In order to make use of the cover on a flatbed trailer, the first set of apertures 68 of the hinges 66 are first secured to the underside of the horizontal flange 26 of the side rails 24 along the longitudinal sides of the deck of a flatbed trailer. The corresponding second set 70 of the cooperating apertures of the hinges 66 are aligned with the first set and secured together using suitable removable bolts 72 so that the sections 52 are pivotally connected at their bottom edges along the side walls 42 to the respective longitudinal sides of the deck. Mounting of the hinges to an underside of the longitudinal sides of the deck ensures that the deck remains flat and free of interruptions from hardware once the covers are removed by simply removing the bolts of the hinges.

Figure 2:
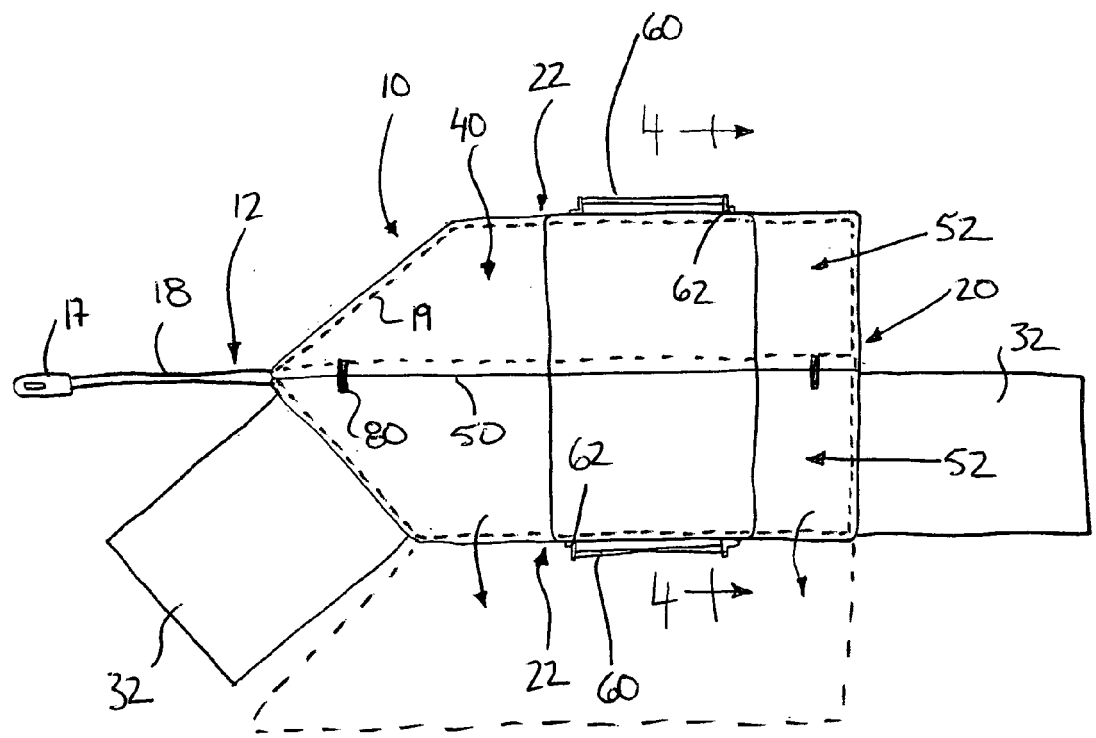
FIGS. 2 and 3 are top plan and front elevational views respectively of the cover shown supported on a trailer.
Figure 3:
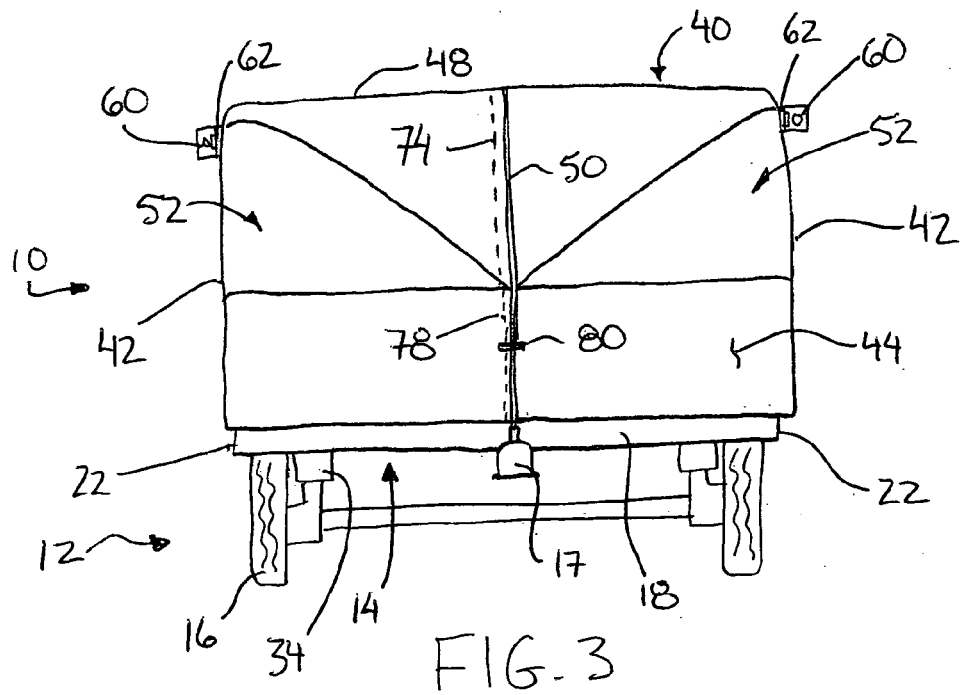

The sections 52 are pivotal from the closed position illustrated in FIG. 4 in which the side walls are vertical, to the open position in a sideways lateral direction perpendicular to the forward direction of travel until the handles substantially lay on the ground and the side walls extend laterally outwardly at a downward incline as shown in FIG. 5. As seen from above in FIG. 2, in which one of the sections is shown in the open position in dotted line, when the sections are opened the front and rear ends of the deck remain fully accessible by the ramps 32 such that the surface of the deck is fully uninterrupted by hinges or any other mechanisms forming part of the cover.

When closing the cover, the section having the gutter secured thereto is first closed with the subsequent section with the depending flange thereon being then pivoted so that the flange is received within the gutter. The latches 80 may then be used to secure the cover in the closed position. The reverse steps are performed with the section having the dependant flange being removed first when the cover is pivoted into the open position.

In further embodiments each of the two sections of the outer shell may be moulded separately as two individual pieces of plastic material or any other suitable lightweight material which has sufficient rigidity to maintain its form in the closed position.

Also, in further embodiments, at the seam, any suitable configuration of abutting edges or overlapping edges can be used as desired for connection between the two sections of the outer shell while still maintaining the advantages of a cover with two sections pivoting laterally outward from one another about respective axes along longitudinal sides of the trailer.

While one embodiment of the present invention has been described in the foregoing, it is to be understood that other embodiments are possible within the scope of the invention. The invention is to be considered limited solely by the scope of the appended claims.

What is claimed is:

1. A cover for a flatbed trailer supported for rolling movement in a forward direction and having a deck with longitudinal sides extending between front and rear ends of the deck, the cover comprising:

an outer shell including a top, two side walls, a front wall and a rear wall, the outer shell being longitudinally divided into two sections, each section including one side wall and a portion of each of the top, the front wall and the rear wall; and hinges for coupling the side walls to respective longitudinal sides of the deck whereby each section is pivotal transversely to the forward direction in relation to the respective longitudinal sides;

wherein the two sections of the outer shell overlap one another at a seam extending longitudinally.

2. The cover according to claim 1 wherein one of the sections includes a gutter along a free edge thereof adjacent the seam and wherein the other one of the sections overlaps the gutter.

3. The cover according to claim 2 wherein said other one of the sections includes a depending flange along a free edge thereof received within the gutter.

4. A cover for a flatbed trailer supported for rolling movement in a forward direction and having a deck with longitudinal sides extending between front and rear ends of the deck, the cover comprising:

an outer shell including a top, two side walls, a front wall and a rear wall, the outer shell being longitudinally divided into two sections, each section including one side wall and a portion of each of the top, the front wall and the rear wall; and hinges for coupling the side walls to respective longitudinal sides of the deck whereby each section is pivotal transversely to the forward direction in relation to the respective longitudinal sides;

each section including a handle fastened to a respective one of the side walls.

5. The cover according to claim 1 wherein each section includes a rigid lining along an inner surface of the side wall.

6. The cover according to claim 5 wherein each section includes a handle on an outer side of the side wall which is secured to the rigid lining.

7. The cover according to claim 1 wherein each section includes a rigid beam along a bottom edge of the section.

8. The cover according to claim 1 wherein the two sections are symmetrical about a vertical plane lying through a longitudinal seam between the two sections.

9. A cover for a flatbed trailer supported for rolling movement in a forward direction and having a deck with longitudinal sides extending between front and rear ends of the deck, the cover comprising:

an outer shell including a top, two side walls, a front wall and a rear wall, the outer shell being longitudinally divided into two sections, each section including one side wall and a portion of each of the top, the front wall and the rear wall; and hinges for coupling the side walls to respective longitudinal sides of the deck whereby each section is pivotal transversely to the forward direction in relation to the respective longitudinal sides;

the front wall being sloped upwardly and rearwardly towards the top.

10. A cover for a flatbed trailer supported for rolling movement in a forward direction and having a deck with longitudinal sides extending between front and rear ends of the deck, the cover comprising:

an outer shell including a top, two side walls, a front wall and a rear wall, the outer shell being longitudinally divided into two sections, each section including one side wall and a portion of each of the top, the front wall and the rear wall; and hinges for coupling the side walls to respective longitudinal sides of the deck whereby each section is pivotal transversely to the forward direction in relation to the respective longitudinal sides;

the rear wall being sloped upwardly and forwardly to the top.

11. The cover according to claim 1 wherein the outer shell is formed of layers of fibreglass material and a core spanning therebetween.

12. The cover according to claim 11 wherein there is provided a rigid lining on at least one wall of the fibreglass material.

13. The cover according to claim 1 wherein each section is integrally moulded of plastic material.

14. A cover in combination with a flatbed trailer supported for rolling movement in a forward direction and having a deck with longitudinal sides extending between front and rear ends of the deck and a ramp selectively coupled to the front and rear ends of the deck, the cover comprising:

an outer shell including a top, two side walls, a front wall and a rear wall, the outer shell being longitudinally divided into two sections, each section including one side wall and a portion of each of the top, the front wall and the rear wall; and hinges for coupling the side walls to respective longitudinal sides of the deck whereby each section is pivotal transversely to the forward direction in relation to the respective longitudinal sides.

15. The combination according to claim 14 wherein the outer shell overlaps a peripheral edge of the deck.

16. The combination according to claim 14 wherein the deck includes lateral flanges projecting outwardly from respective longitudinal sides of the deck, the hinges being coupled to an underside of the lateral flanges respectively.

17. The combination according to claim 14 wherein the hinges include a first portion secured to the longitudinal sides of the deck and a second portion secured to the side walls of the outer shell in which the first and second portions are selectively separable from one another.

18. The combination according to claim 14 wherein the side walls, the front wall and the rear wall of the shell are aligned with respective edges of the deck in the closed position of the outer shell.

19. The combination according to claim 14 wherein an upper surface of the deck is uninterrupted by the hinges in both open and closed positions of the cover.

* * * * *